United States Patent
Sarder et al.

(10) Patent No.: US 11,177,720 B2
(45) Date of Patent: Nov. 16, 2021

(54) STANDBY GENERATOR ENGINE-FAN-ALTERNATOR CONFIGURATION

(71) Applicant: Champion Power Equipment, Inc., Santa Fe Springs, CA (US)

(72) Inventors: Mark J. Sarder, Waukesha, WI (US); Russell J. Dopke, Elkhart Lake, WI (US); Hiroaki Sato, Brookfield, WI (US); Leigh A. Jenison, Hartland, WI (US)

(73) Assignee: Champion Power Equipment, Inc., Sante Fe Springs, CA (US)

( * ) Notice: Subject to any disclaimer, the term of this patent is extended or adjusted under 35 U.S.C. 154(b) by 144 days.

(21) Appl. No.: 16/394,426

(22) Filed: Apr. 25, 2019

(65) Prior Publication Data

US 2019/0356198 A1 Nov. 21, 2019

Related U.S. Application Data

(60) Provisional application No. 62/672,790, filed on May 17, 2018.

(51) Int. Cl.
| | |
|---|---|
| *F02B 63/04* | (2006.01) |
| *H02K 7/18* | (2006.01) |
| *H02K 15/14* | (2006.01) |
| *H02P 9/48* | (2006.01) |

(52) U.S. Cl.
CPC ......... *H02K 7/1815* (2013.01); *F02B 63/042* (2013.01); *H02K 15/14* (2013.01); *H02P 9/48* (2013.01)

(58) Field of Classification Search
CPC .......... H02K 5/20; H02K 7/18; H02K 7/1815; H02K 9/06; H02K 15/14; H02P 9/48; F02B 63/00; F02B 63/04; F02B 63/042; F02B 63/044; F02B 63/048; F01P 5/04; F01P 5/06; F01P 1/02; F01P 1/06
See application file for complete search history.

(56) References Cited

U.S. PATENT DOCUMENTS

| | | | |
|---|---|---|---|
| 4,608,946 A | 9/1986 | Tanaka et al. | |
| 4,647,835 A * | 3/1987 | Fujikawa | F02B 63/04 |
| | | | 290/1 B |
| 4,702,201 A | 10/1987 | Odo et al. | |
| 5,899,174 A | 5/1999 | Anderson et al. | |
| 6,028,369 A | 2/2000 | Hirose et al. | |
| 6,331,740 B1 | 12/2001 | Morohoshi et al. | |
| 6,376,944 B1 | 4/2002 | Grizzle, Jr. et al. | |
| 6,489,690 B1 | 12/2002 | Hatsugai et al. | |

(Continued)

FOREIGN PATENT DOCUMENTS

| | | |
|---|---|---|
| CN | 1800600 A | 7/2006 |
| CN | 2890369 Y | 4/2007 |

(Continued)

*Primary Examiner* — Tran N Nguyen
(74) *Attorney, Agent, or Firm* — Ziolkowski Patent Solutions Group, SC (57) ABSTRACT

A standby generator includes an air-cooled engine having a crankshaft, an alternator driven by the crankshaft to produce electrical power for distribution from the standby generator, and an engine cooling fan operatively coupled to the crankshaft on a side of the engine driving the alternator.

19 Claims, 6 Drawing Sheets

(56) References Cited

U.S. PATENT DOCUMENTS

| | | | |
|---|---|---|---|
| 6,491,133 B2 * | 12/2002 | Yamada | E02F 9/0866 |
| | | | 123/195 C |
| 6,784,574 B2 | 8/2004 | Turner et al. | |
| 6,825,573 B2 | 11/2004 | Suzuki et al. | |
| 6,975,042 B2 | 12/2005 | Yamada et al. | |
| 7,537,070 B2 | 5/2009 | Maslov et al. | |
| 7,642,665 B2 | 1/2010 | Konop et al. | |
| 8,899,191 B2 | 12/2014 | Yano et al. | |
| 9,617,951 B2 | 4/2017 | Sotiriades et al. | |
| 2002/0000342 A1 | 1/2002 | Yamada et al. | |
| 2009/0229544 A1 * | 9/2009 | Hatsugai | H02K 9/06 |
| | | | 123/41.56 |
| 2013/0187392 A1 | 7/2013 | Janscha et al. | |
| 2016/0233739 A1 | 8/2016 | Jenison et al. | |
| 2016/0294255 A1 | 10/2016 | Schmit et al. | |
| 2016/0319728 A1 | 11/2016 | Jenison et al. | |

FOREIGN PATENT DOCUMENTS

| | | |
|---|---|---|
| CN | 204024810 U | 12/2014 |
| CN | 104314676 A | 1/2015 |

* cited by examiner

STANDBY GENERATOR ENGINE-FAN-ALTERNATOR CONFIGURATION

CROSS-REFERENCE TO RELATED APPLICATION

The present application is a non-provisional of, and claims priority to, U.S. Provisional Patent Application Ser. No. 62/672,790, filed May 17, 2018, the disclosure of which is incorporated herein by reference in its entirety.

BACKGROUND OF THE INVENTION

Embodiments of the invention relate generally to standby generators, and more particularly to an engine cooling fan positioned between an engine driving an alternator within a standby generator enclosure.

Standby generators provide a convenient source of electricity for use when outages occur in the utility grid. Some standby generators use an alternator driven by an internal combustion engine to produce electrical power for distribution to a home or building. The engine typically operates on fuel from a fuel tank located onsite or from a fuel line connected to the home or building. The fuel is combusted in one or more cylinders of the engine causing translational motion of a piston in each cylinder. The translational motion of each piston is converted into rotational motion by a crankshaft which is coupled to drive the alternator. The alternator produces electrical power that can be delivered to an electrical panel of the home or building.

Standby generators typically house the engine and the alternator in a standby generator enclosure. A standby generator enclosure can protect the generator from adverse weather conditions and protect people and animals from electrical and mechanical hazards within the enclosure. Standby generator enclosures may include one or more airflow openings to provide fresh air to the generator. The fresh air can be used for combustion within cylinders of the engine but can also be used to cool generator components within the enclosure. Exhaust fumes following combustion can be vented from the enclosure through an airflow opening, as can cooling air expelled from generator components.

For example, some standby generators have an air-cooled engine that may require an engine cooling fan to prevent the engine from overheating. The engine may require cooling air drawn into the enclosure through one of the airflow openings and driven out of the enclosure through a different airflow opening after cooling the engine. Unfortunately, an engine cooling fan may be ineffective if not properly integrated within the generator enclosure. That is, the engine cooling fan could circulate hot air within the enclosure or could drive cooling air expelled from the engine directly over temperature critical generator components.

Therefore, it would be desirable to provide a standby generator having an air-cooled engine with an engine fan positioned for improved airflow management within a standby generator enclosure. It would be further desirable to provide a standby generator having an alternator positioned upstream from an engine cooling fan.

BRIEF DESCRIPTION OF THE INVENTION

Embodiments of the invention are directed to a standby generator having an engine driving an alternator with an engine cooling fan positioned therebetween.

In accordance with one aspect of the invention, a standby generator includes an air-cooled engine having a crankshaft, an alternator driven by the crankshaft to produce electrical power for distribution from the standby generator, and an engine cooling fan operatively coupled to the crankshaft on a side of the engine driving the alternator.

In accordance with another aspect of the invention, a generator includes an air-cooled engine, an alternator driven by the engine via a shaft extending from the engine to the alternator, and an engine cooling fan operatively coupled to the shaft between the engine and the alternator. The engine cooling fan may be coupled to the shaft in a spaced relationship from the alternator so as to create an airflow path to the engine cooling fan that bypasses the alternator.

In accordance with yet another aspect of the invention, a standby generator includes a generator housing having a base, a top, and a plurality of sidewalls defining an interior of the housing, the housing including one or more airflow inlets and one or more airflow outlets. The standby generator also includes an engine mounted to the base with the engine including a crankcase, a crankshaft coupled to the crankcase, and an engine fan driven by the crankshaft to cool the engine. The engine fan can draw a first stream of air into the housing through at least one of the one or more airflow inlets and drive the first stream of air out through at least one of the one or more airflow outlets. The standby generator further includes an alternator mounted to the base and driven by the crankshaft on a side of the engine fan opposite the crankcase.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

The operating environment of the invention is described with respect to a standby generator. However, those skilled in the art will appreciate that the invention is equally applicable for use with portable or other electrical generators. While the invention will be described with respect to a standby generator having a multi-chamber generator enclosure, embodiments of the invention are equally applicable for use with single-chamber or other types of generator enclosures.

Figure 1:
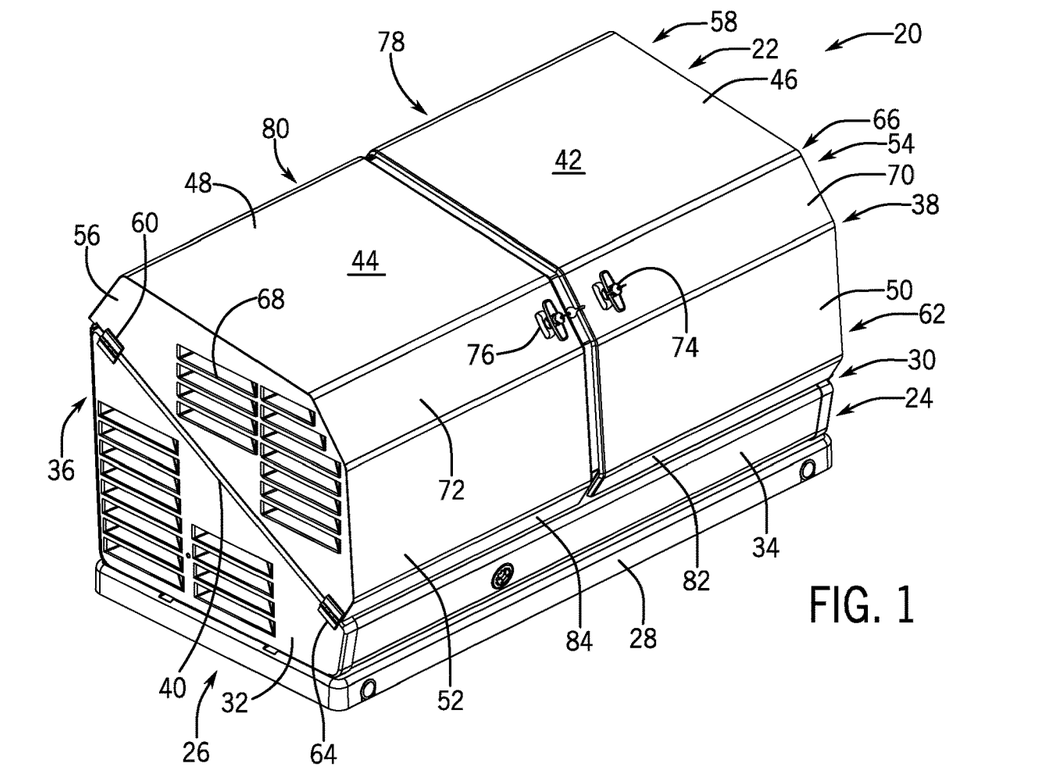
FIG. 1 is a perspective view from the left upper side of an electrical generator, according to an embodiment of the invention.

Referring to FIG. 1, a standby generator 20 is shown, in accordance with an embodiment of the invention. The standby generator 20 produces electrical energy and may deliver the electrical energy to a distribution panel of a home, office, shop, business or any other building requiring electricity. The standby generator 20 may include an internal combustion engine, an alternator driven by the internal combustion engine, and other associated components. The internal combustion engine operates on a fuel source that may include gasoline, diesel, liquefied petroleum gas (LPG), propane, butane, natural gas, or any other fuel source suitable for operating the engine. For instance, the internal combustion engine may comprise a single fuel engine configured to operate on one of the fuels. Alternatively, the engine may comprise a dual fuel or multi-fuel engine configured to switch operation between two or more of the fuel sources. In one embodiment, the engine may comprise a dual fuel engine configured to switch operation between LPG and gasoline, or LPG and diesel. The alternator and engine may form an engine-generator set used to produce electricity for distribution from the standby generator 20.

The standby generator 20 may include a standby generator enclosure 22 to house the engine-generator set and other associated components. In the embodiment of FIG. 1, the engine-generator set is positioned in a horizontal crankshaft arrangement with the alternator located toward a first end 24 of the enclosure 22 and the engine located toward a second end 26 of the enclosure 22. The standby generator enclosure 22 may include a base 28 to support the engine-generator set. The enclosure 22 may also have a first sidewall 30 and a second sidewall 32 each extending generally vertically from opposite ends of the base 28 at the first end 24 and the second end 26 of the enclosure 22, respectively. The enclosure 22 may also include a front wall 34 and a back wall 36 extending generally vertically from the base 28 between the first sidewall 30 and the second sidewall 32, with the front wall 34 and the back wall 36 defining a front and a back sidewall of the standby generator 20. The front wall 34 and the back wall 36 may be angled slightly from vertical such that each has a bottom portion positioned slightly inward from a corresponding top portion. The first sidewall 30 and the second sidewall 32 may each have a respective top edge 38, 40 that generally slopes diagonally from a taller back wall 36 to a shorter front wall 34.

The enclosure 22 may also include one or more hoods to cover the standby generator 20. The embodiment shown in FIG. 1 has a first hood 42 and a second hood 44, also referred to as doors, coupled to a respective first sidewall 30 and second sidewall 32. The first hood 42 and the second hood 44 may each have a top panel 46, 48, a front panel 50, 52, and a side panel 54, 56 with the side panels generally perpendicular to the respective top and front panels. The side panels 54, 56 of each hood 42, 44 may each be a coupled to a respective one of the first sidewall 30 and the second sidewall 32 of the enclosure 22 using a first hinge 58, 60 and a second hinge 62, 64. The side panels 54, 56 may include vents 66, 68 with louvers, and vents may be formed in the first sidewall 30 and the second sidewall 32. The top panels 46, 48 are preferably sloped downward toward the front of the enclosure 22 and the front panels 50, 52 may slope forward toward the base 28 of the enclosure 22 to enhance water runoff.

Each hood 42, 44 may also have a front transition panel 70, 72 between the respective top panel 46, 48 and the front panel 50, 52. The front transition panels 70, 72 further encourage water runoff and add to an aesthetically pleasing design. A handle 74, 76 may be attached to the front transition panel 70, 72 of each hood 42, 44 for opening the hoods and exposing internal components of the standby generator 20. The front transition panels 70, 72 are designed so the handles 74, 76 enhance accessibility by directionally facing a person standing in front of the enclosure 22 when the hoods 42, 44 are closed. Each hood 42, 44 may also have a rear transition panel 78, 80 that slopes downward from the respective top panel 46, 48 toward the back wall 36 when the hoods are closed. Each hood 42, 44 may also have a lower transition panel 82, 84 that slopes inward from the respective front panel 50, 52 toward the front wall 34 when the hoods are closed. The rear transition panels 78, 80 and the lower transition panels 82, 84 further encourage water runoff and add to an aesthetically pleasing design.

Figure 2:
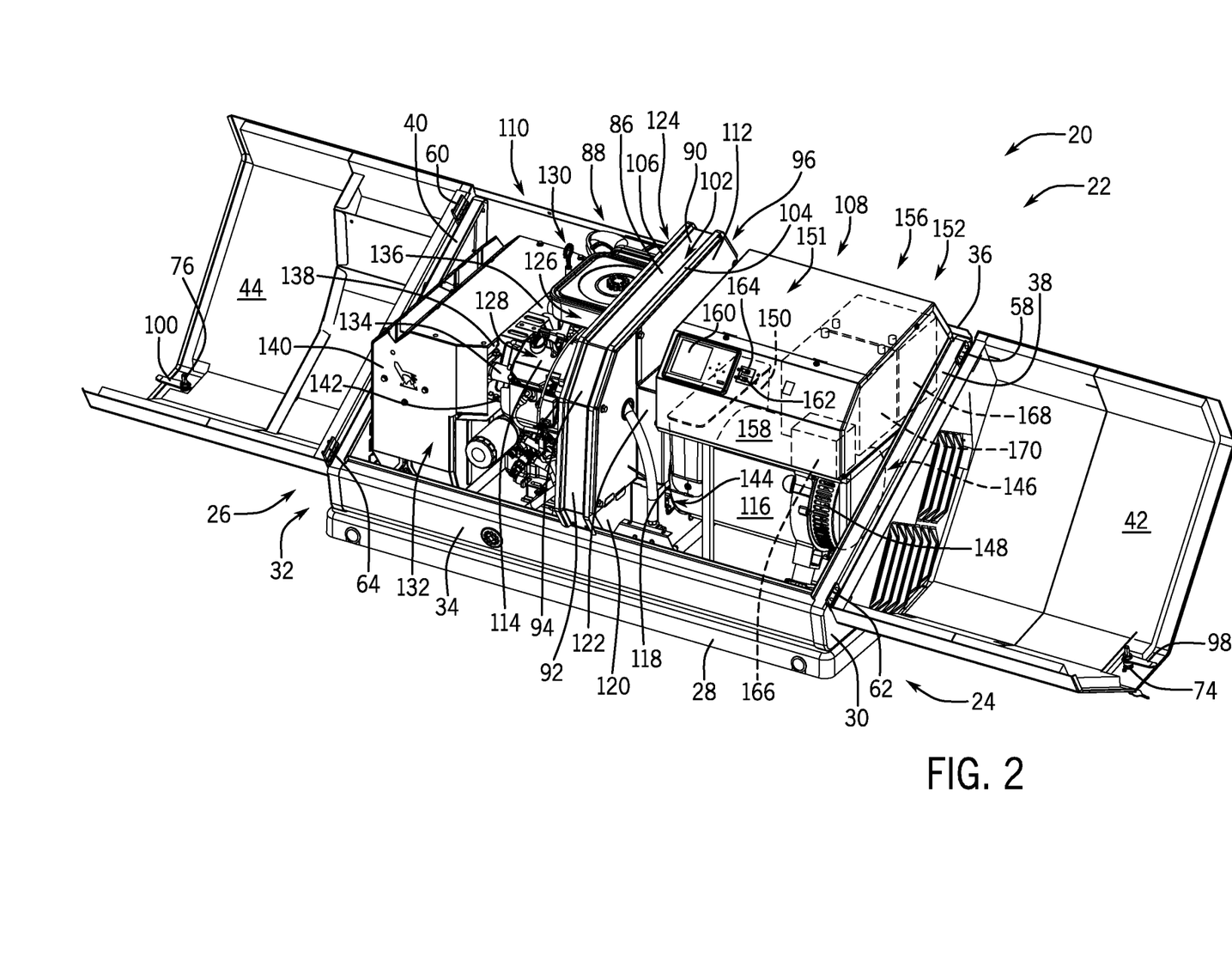
FIG. 2 is a perspective view from the right upper side of the electrical generator of FIG. 1 with left and right hoods opened to expose the electrical generator components within, according to an embodiment of the invention.

Referring now to FIG. 2, a standby generator 20 having a first hood 42 and a second hood 44 in an open position is shown, in accordance with an embodiment of the invention. The generator enclosure 22, also referred to as a housing 22, may have a base 28, a top (i.e. hoods 42, 44), and a plurality of sidewalls 30, 32, 34, 36 defining an interior of the housing. The first hood 42 and the second hood 44 may be coupled to a respective sidewall 30, 32 using a first hinge 58, 60 and a second hinge 62, 64 with the first hinges near the back of the enclosure 22 and the second hinges near the front of the enclosure 22. The first hood 42 may be hinged to the enclosure 22 to rotate over a top of the first sidewall 30 and the second hood 44 may be hinged to the enclosure 22 to rotate over a top of the second sidewall 32. The first hood 42 and the second hood 44 may rotate about an upper or top edge 38, 40 of each respective sidewall 30, 32 beyond the first end 24 and the second end 26 of the enclosure 22 in a "gull wing" configuration for ease of access and serviceability to the generator 20. The "gull wing" configuration may allow the hoods 42, 44 to open without contacting a home, office, shop, business, or any other building requiring electricity located behind the standby generator 20.

The first hood 42 and the second hood 44 may open outwards beyond the respective first sidewall 30 and second sidewall 32 to expose a top and front entrance into the enclosure 22. The front wall 34 may be relatively short compared to the overall height of the enclosure 22 in part to allow for improved front access into the enclosure 22 when the hoods 42, 44 are open. The back wall 36 may be relatively tall compared to the front wall 34 with the first sidewall 30 and the second sidewall 32 having a forward sloping top edge 38, 40 from the back wall 36 to the front wall 34. The first hood 42 and the second hood 44 can then open upward and slightly forward as they rotate along the forward sloping top edge 38, 40 of each respective sidewall 30, 32. In other embodiments, the first hood 42 and the second hood 44 may rotate about a horizontal or vertical edge of a respective first sidewall 30 and second sidewall 32 between opened and closed positions.

FIG. 2 also shows a support arm 86 extending across a center of the enclosure 22 to support the first hood 42 and the second hood 44 in the closed position. The support arm 86 extends from the back wall 36 over the engine-generator set 88 to the front wall 34 in the enclosure 22. The support arm 86 may have a geometry that matches the first hood 42 and the second hood 44 to ensure the hoods close tightly against the support arm. Accordingly, the support arm 86 may have a top panel 90, a front panel 92, a front transition panel 94, and a rear transition panel 96 to match the first hood 42 and the second hood 44. The support arm 86 may also receive a latch 98, 100 from each handle 74, 76 to hold the first hood 42 and the second hood 44 closed.

The support arm 86 preferably has a channel or gutter 102 extending the length of the support arm to channel water off the front and back of the enclosure 22. The gutter 102 may be formed by raised outer edges that include a first rain seal 104 and a second rain seal 106 on opposite sides of the support arm 86. The first rain seal 104 and the second rain seal 106 each support and seal a respective hood 42, 44 in the closed position. The first rain seal 104 and the second rain seal 106 may also extend across portions of the back wall 36, front wall 34, and respective first and second sidewalls 30, 32 to seal around each perimeter entrance covered by the hoods 42, 44. The rain seals 104, 106 prevent rain from entering the enclosure 22 and may make the enclosure rain tight. Although some water may enter the enclosure 22 without negatively affecting the generator 20, it is desirable to prevent water from entering the electrical areas within the enclosure 22. The rain seals 104, 106 may make the electrical areas within the enclosure 22 rain tight.

In one embodiment of the invention, the enclosure 22 may comprise a multi-chamber standby generator enclosure comprising a plurality of chambers. The enclosure 22 may be separated into a right chamber 108 and a left chamber 110 by a partition wall 112, with the engine 114 and the alternator 116 mounted in separate respective chambers 108, 110 of the plurality of chambers. The partition wall 112 may extend from the support arm 86 to the base 28 of the enclosure 22, and also from the front wall 34 to the back wall 36 of the enclosure 22. The partition wall 112 may have an opening 118 through which the engine 114 mounted to the base 28 in the left chamber 110 can couple to drive the alternator 116 mounted to the base 28 in the right chamber 108. The partition wall 112 may comprise a main segment 120 aligned with the support arm 86 and an offset segment 122 spaced apart from the main segment in a direction opposite the engine 114. The offset segment 122 provides clearance for air to flow between the engine 114 and the partition wall 112 from an airflow opening 124 in the back wall 36.

FIG. 2 shows the engine 114 mounted in a horizontal crankshaft orientation with the crankshaft driving the alternator 116 through the opening 118 in the partition wall 112. The engine 114 may comprise an air-cooled engine having an engine cooling fan 126 at a front portion of the engine facing the partition wall 112. The engine fan 126 may draw a stream of air along the offset segment 122 of the partition wall 112 into the enclosure 22 through the airflow opening 124 in the back wall 36. The engine fan 126 preferably drives the stream of air over cylinders 128, 130 of the engine 114 in a direction toward the second end 26 of the enclosure 22. The engine 114 may also include an exhaust system 132 operatively coupled to the engine 114, the exhaust system 132 may comprise one or more exhaust pipes 134, 136 extending from the engine 114 in a direction downstream from the engine cooling fan 126, and a muffler 138 may be coupled to at least one of the one or more exhaust pipes 134, 136.

The muffler 138 may be positioned within a muffler box 140. The muffler box 140 can surround the muffler 138 managing heat transfer from the muffler 138 within the enclosure 22. The muffler box 140 may extend approximately from the engine 114 to the second sidewall 32 and approximately from the front wall 34 to the back wall 36 of the enclosure 22. The muffler box 140 may mount to the base 28 of the enclosure 22 and extend to a height above cylinders 128, 130 of the engine 114. The exhaust pipes 134, 136 may extend through an opening 142 into the muffler box 140, with the opening 142 positioned in an airflow path downstream from the engine fan 126. The muffler box 140 receives cooling air expelled from the engine 114 through the opening 142 and cools the muffler 138 by directing the cooling air over the muffler 138. The muffler box 140 may also direct the cooling air out of the enclosure 22 through vents in the second sidewall 32.

The alternator 116 may be driven by the engine 114 to produce electrical power for distribution from the standby generator 20. The alternator 116 may have a first end 144 coupled to the engine 114 and a second end 146 having an alternator cooling fan 148 on a side of the alternator 116 opposite the engine 114. An inlet air duct 150 is shown coupled to a side of the alternator 116 proximate the first end 144 in fluid communication with the alternator cooling fan 148. Accordingly, the alternator may comprise an alternator cooling fan 148 that draws air through the alternator 116 in a direction opposite the engine 114. In one embodiment of the invention, the inlet air duct 150 may couple the alternator 116 to a generator control box 158 to provide cooling air flowing through the control box to the alternator cooling fan 148. The control box 158 is shown coupled to an airflow opening 152 in the back wall 36 in fluid communication with the alternator cooling fan 148. The inlet air duct 150 and the control box 158 may together form an air passageway or air duct 151 extending from the opening 152 to the alternator 116. Accordingly, cooling air can enter the enclosure 22 through the opening 152 and pass through the air duct 151 to the alternator 116. In an alternative embodiment, the inlet air duct 150 extends to an opening in the back wall 36 and includes a boot that seals the inlet air duct 150 to the opening. The alternator cooling fan 148 draws cooling air axially through the alternator 116 from the inlet air duct 150 and can drive the cooling air out of the enclosure 22 through vents in the first sidewall 30.

The standby generator 20 may include a control system 156 to operate the generator 20. The control system 156 may include the control box 158 to receive generator control components therein. The control box 158 is shown mounted to the back wall 36 extending forward above the alternator 116 in the right chamber 108. The control system 156 may include a touch screen display 160 mounted on the control box 158, which may receive control inputs and/or display generator operating parameters. The control system 156 may include a first and a second circuit breaker 162, 164 having manual switches mounted on an outer surface of the control box 158. The circuit breakers 162, 164 can couple to electrical distribution lines from the alternator 116 such that the manual switches can be operated to control electrical distribution from the generator 20. The control system 156 may also include a battery charger 166 mounted in the control box 158 to charge a first battery 168 and a second battery 170 located in a lofted battery box configuration of the control box for ease of access within the enclosure 22. The batteries 168, 170 can be used to crank the engine 114 for startup in the event of a power outage in the utility grid.

Figure 3:
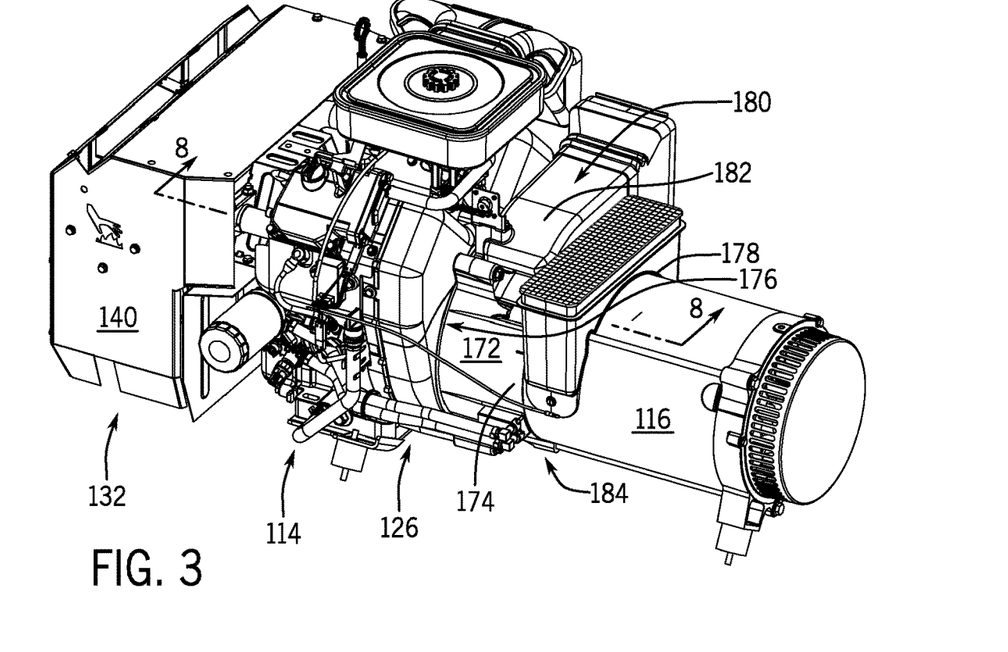
FIG. 3 is a perspective view showing components of the electrical generator of FIG. 1 from the right upper side of an alternator driven by an engine having a muffler positioned in a muffler box, according to an embodiment of the invention.

Referring now to FIG. 3, the alternator 116 coupled to the engine 114 with the exhaust system 132 extending into the muffler box 140 is shown, in accordance with an embodiment of the invention. In a preferred embodiment, an alternator adaptor 172 may couple the alternator 116 to the engine 114. The alternator adaptor 172 may have a main body comprising a cylinder 174. The main body 174 may have an engine mounting flange 176 at a first end of the cylinder 174 connected to the engine 114, and an alternator mounting flange 178 at a second end of the cylinder 174 connected to the alternator 116. The alternator adaptor 172 preferably includes openings through the engine mounting flange 176 and the alternator mounting flange 178 for passage of a shaft extending from the engine 114 to the alternator 116.

The alternator adaptor 172 may also include an inlet air duct 180 extending from a side of the alternator adaptor 172 between the engine mounting flange 176 and the alternator mounting flange 178. The inlet air duct 180 may be in fluid communication with the opening in the engine mounting flange 176 to provide airflow to the engine fan 126. The inlet air duct 180 has a generally rectangular cross-section having a width approximately equal to the length of the adaptor cylinder 174, and a height slightly larger than a diameter of the cylinder 174. The inlet air duct 180 can extend across a center of the cylinder 174 with a top surface 182 and a bottom surface 184 curving into the cylinder 174.

Figure 4:
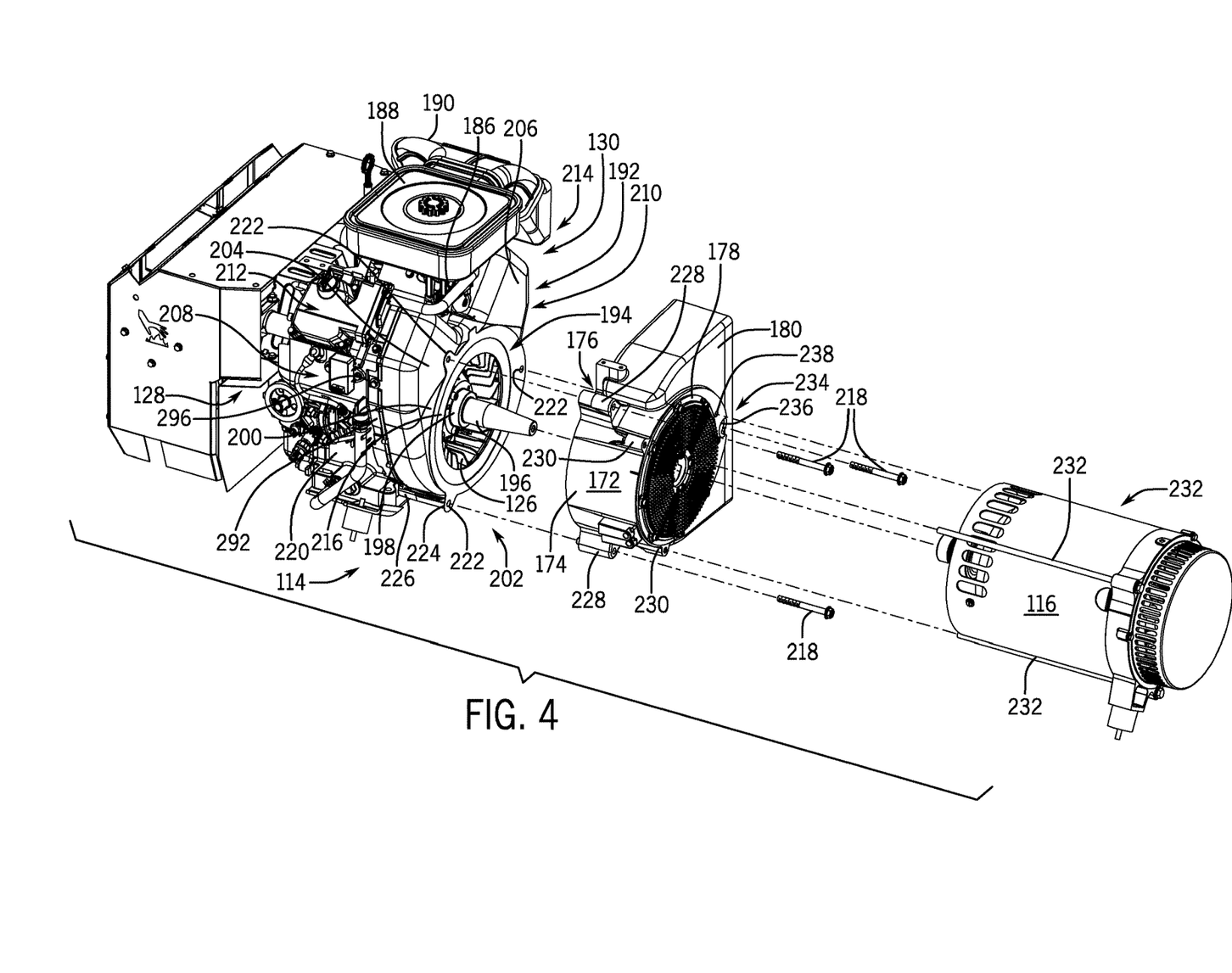
FIG. 4 is a perspective view similar to FIG. 3 having the alternator and an alternator adaptor exploded from the engine, according to an embodiment of the invention.

Referring now to FIG. 4, the alternator 116 and the alternator adaptor 172 exploded from the engine 114 are shown, in accordance with an embodiment of the invention. The engine 114 may comprise a v-twin engine having two cylinders 128, 130. Each cylinder 128, 130 may receive a fuel and air mixture from a carburetor 186 located between or slightly above the cylinders 128, 130. The carburetor 186 mixes air with a liquid fuel, e.g. gasoline, and supplies the mixture to the cylinders 128, 130. The carburetor 186 can be coupled to receive air from an air filter 188 mounted on a top portion of the engine 114. The air filter 188 may receive air through an air duct 190.

FIG. 4 also shows a fan cover 192 mounted over the engine cooling fan 126 between the engine 114 and the alternator adaptor 172, the fan cover 192 preferably having an airflow opening 194 surrounding the crankshaft 196 of the engine. The engine fan 126 is shown mounted to the crankshaft 196 via a fan base 198. The engine fan 126 preferably draws a stream of cooling air through the alternator adaptor 172 into the opening 194 in a main section 200 of the fan cover 192. Accordingly, the engine cooling fan 126 may be operatively coupled to the crankshaft 196 on a side of the engine 114 driving the alternator 116.

The fan cover 192 may be mounted over a front side 202 of the engine 114. The fan cover 192 can mount to a fan back plate 292 coupled to a front portion of the engine 114, with fasteners 296 securing the fan cover 192 to the back plate 292. The fan cover 192 can include the main section 200 covering the engine fan 126, and a first arm 204 and a second arm 206 each extending from the main section to cover a front side 202 of a respective cylinder 128, 130. For instance, the fan cover 192 is shown mounted over the engine cooling fan 126 and over sides of two cylinder blocks 208, 210 and sides of two cylinder heads 212, 214 of the cylinders 128, 130 facing the alternator 116. The engine fan 126 preferably drives cooling air from the main section 200 through the first arm 204 and the second arm 206 to the cylinders 128, 130.

The fan cover 192 may include an alternator adaptor mounting surface 216 that mates to the alternator adaptor 172. Fasteners 218 can extend through openings in the alternator adaptor mounting surface 216 to mount the alternator adaptor 172 to the back plate 292 coupled to the crankcase 220. The fan cover 192 is shown having three openings 222 for the fasteners 218 with one opening located in a tab 224 extending outward from the main section 200 of the fan cover 192. The back plate 292 may have mounting locations 226 each comprising a boss extending forward from the engine 114 and each having a threaded opening to receive a respective fastener 218 from the alternator adaptor 172.

The alternator adaptor 172 may include a first set of mounting projections 228 with openings that receive fasteners 218 coupling the engine 114 to the alternator adaptor 172, and a second set of mounting projections 230 with openings that receive fasteners 232 coupling the alternator 116 to the alternator adaptor 172. For improved access to the fasteners 218, 232, the two sets of mounting projections 228, 230 may be offset from each other in a circumferential direction around the adaptor cylinder 174. The alternator adaptor 172 may have a support arm 234 extending across a midsection of the inlet air duct 180 from the engine mounting flange 176 to the alternator mounting flange 178. The support arm 234 can include an opening 236 for a fastener 218 coupling the alternator adaptor 172 to the engine 114. An opening 238 in the alternator adaptor 172 may be offset from the support arm 234 to receive a fastener 232 that couples the alternator 116 to the alternator adaptor 172.

Figure 5:
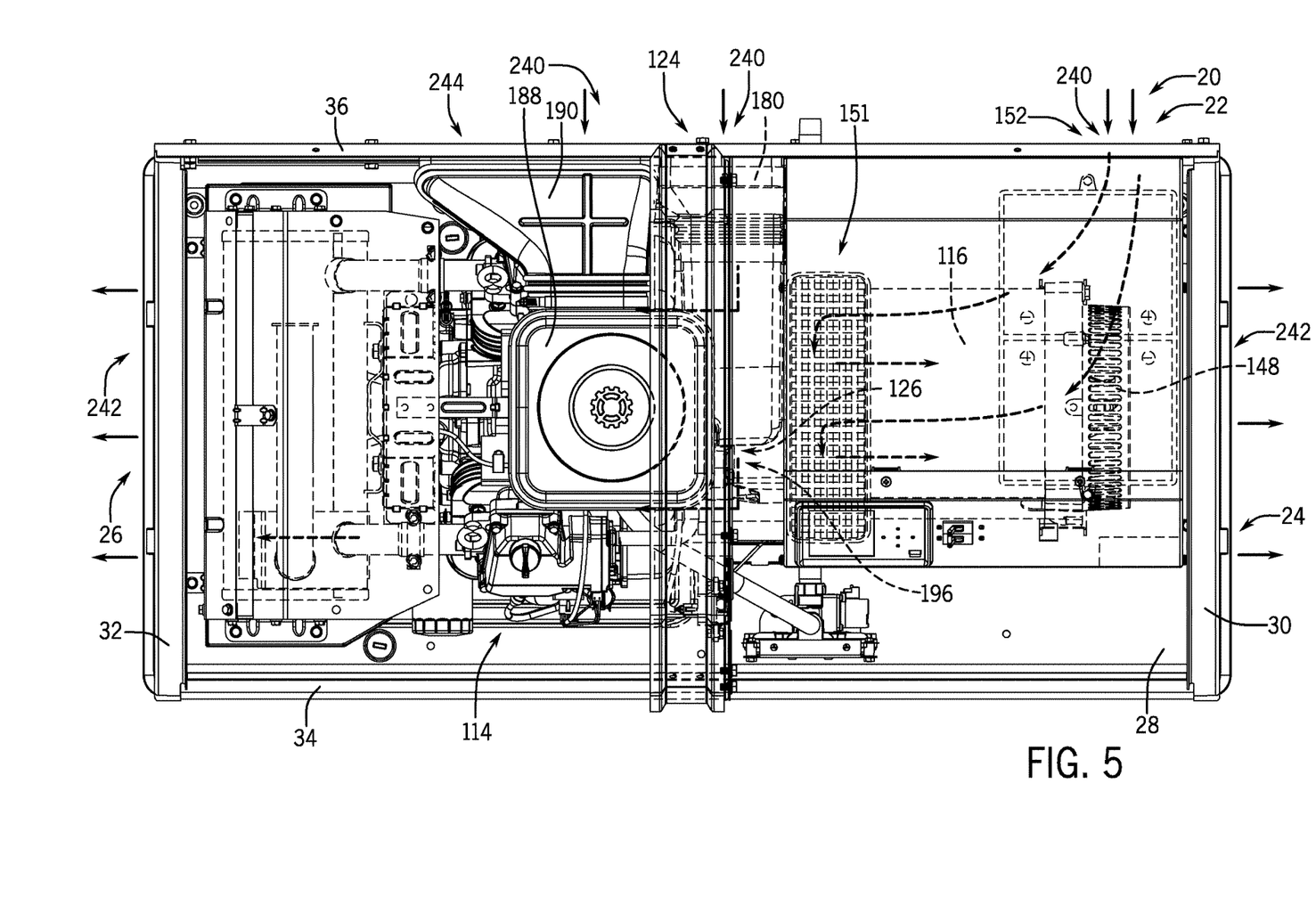
FIG. 5 is a top view of the generator of FIG. 1 with left and right hoods hidden to expose the electrical generator components within, according to an embodiment of the invention.

Referring now to FIG. 5, a top view of the generator 20 looking into the housing 22 is shown, according to an embodiment of the invention. The housing 22 may comprise one or more airflow inlets 240 and one or more airflow outlets 242. The engine fan 126 of engine 114 is driven by the crankshaft 196 to cool the engine 114, the engine fan shown drawing a first stream of air into the housing 22 through at least one of the one or more airflow inlets 240 and driving the first stream of air out through at least one of the one or more airflow outlets 242. The inlet air duct 180, also referred to as an engine air duct, may couple the engine 114 to one or more airflow inlets 240 in fluid communication with the engine fan 126. The alternator 116 is shown mounted to the engine 114 in a spaced relationship with the engine air duct 180 mounted therebetween. FIG. 5 also shows the engine air duct 180 coupled to an airflow opening 124 in the back wall 36 of the enclosure 22 along with the air filter 188 coupled to an air duct 190 extending to an opening 244 in the back wall 36 of the enclosure 22.

The alternator fan 148 of alternator 116 is driven by the crankshaft 196, the alternator fan shown cooling the alternator 116 by drawing a second stream of air into the housing 22 through at least one of the one or more airflow inlets 240 and driving the second stream of air out through at least one of the one or more airflow outlets 242. The alternator air duct 151 may couple the alternator 116 to one or more airflow inlets 240 in fluid communication with the alternator fan 148. The engine air duct 180 and the alternator air duct 151 may both couple to one or more airflow inlets 240 located in the same or a different one of the top (i.e. hoods 42, 44 of FIG. 1), base 28, or sidewalls 30, 32, 34, 36 of the enclosure 22. While the airflow opening 124 coupled to the engine air duct 180 is illustrated distinct from the airflow opening 152 coupled to the alternator air duct 151, the openings 124, 152 could be integral to each other to provide a single opening into the enclosure 22 to the engine air duct and the alternator air duct. The first stream of air and the second stream of air may be driven out of the housing 22 through separate airflow outlets 242, and the separate airflow outlets are shown located at opposite ends 24, 26 of the housing.

Figure 6:
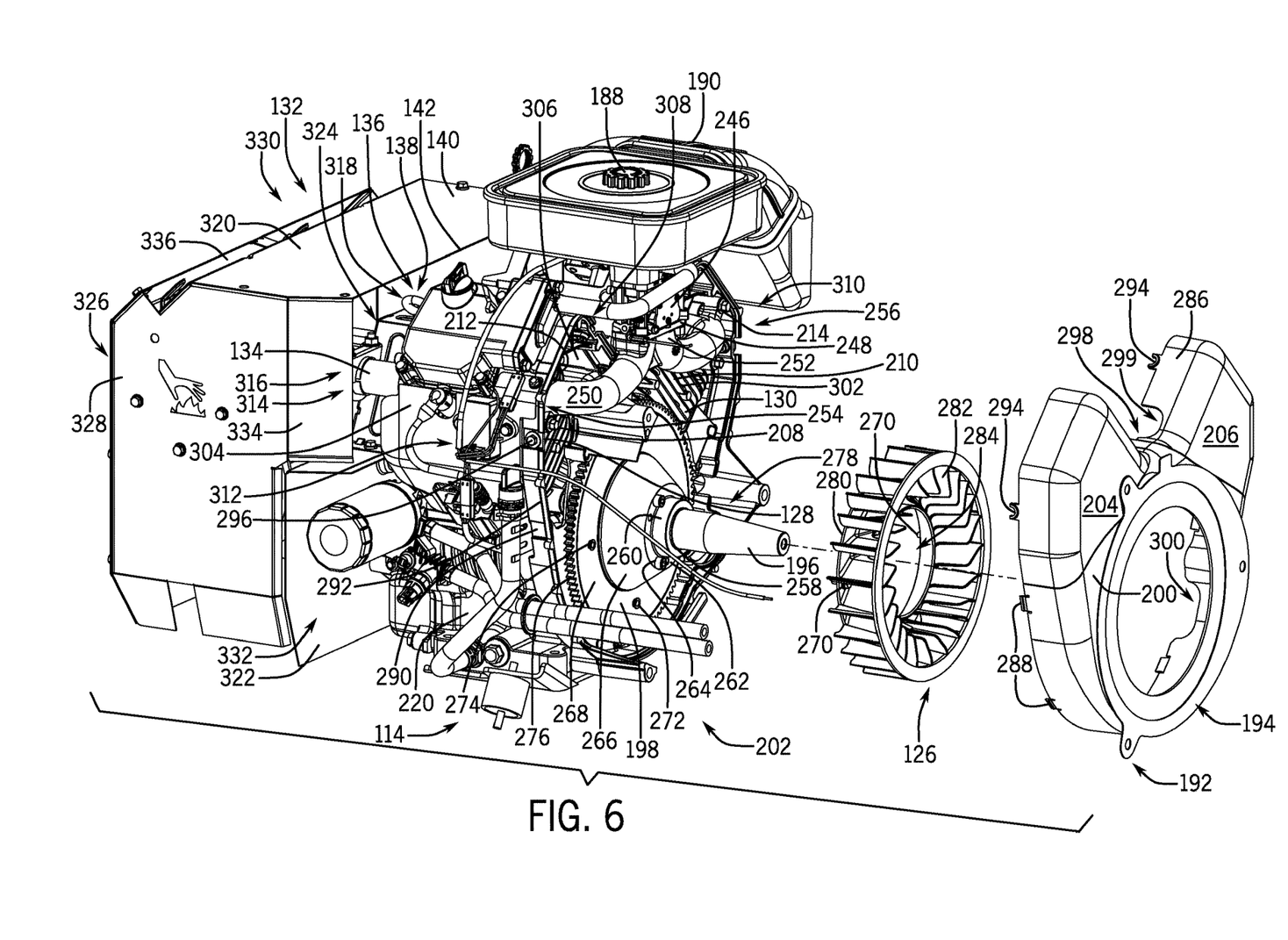
FIG. 6 is a perspective view from the right upper side of the engine and muffler box of FIG. 3 with an engine fan and a fan cover exploded from the engine, according to an embodiment of the invention.

Referring now to FIG. 6, the engine 114 is shown with the engine fan 126 and the fan cover 192 exploded from the engine 114, according to an embodiment of the invention. FIG. 6 shows an embodiment of the engine 114 having a fuel and air mixer 246 coupled between the cylinders 128, 130 on a top portion of the engine 114. The fuel and air mixer 246 may couple to air filter 188 that receives air from an air duct 190. The fuel and air mixer 246 combines air with gaseous fuel and supplies the combination to the cylinders 128, 130. The fuel and air mixer 246 couples to an intake manifold 248 having an intake pipe 250, 252 for each cylinder. The intake pipes 250, 252 cross a front side 202 of the engine 114 to intake ports 254, 256 of a respective cylinder head 212, 214. The fuel and air mixer 246 may be used instead of a carburetor for engines configured to operate on gaseous fuel, for instance LPG, propane, or natural gas.

To support the engine fan 126 on the engine 114, fan base 198 may be mounted on the crankshaft 196 via a bushing 258. The fan base 198 may include a cylindrical component 260 and a flat component 262 mounted over the bushing 258 with a plurality of fasteners 264 coupling the flat component 262 to the bushing 258. The fan base 198 may also include a domed shape component 266 extending from the flat component 262 over the bushing 258. The fan base 198 may also include a circular plate 268 coupled to the domed shape component 266 to receive the engine fan 126 mounted thereon with a plurality of fasteners 270 that extend through openings 272 in the circular plate 268. The circular plate 268 may have inserts 274 in the openings 272 for improved structural rigidity. FIG. 6 shows the fan base 198 as a single integrated component. A ring gear 276 can also couple to an outer radius of the circular plate 268, the ring gear 276 having gear teeth driven by a starter motor 278 coupled to the crankcase 220.

The engine fan 126 may include an annular disc 280 with a plurality of fan blades 282 extending from one side of the annular disc. The fan blades 282 are shown extending from a center opening 284 to a perimeter of the annular disc 280. The annular disc 280 may include openings for the fasteners 270 to mount the engine fan 126 to the fan base 198, which may comprise a plurality of bolts. The crankshaft 196 can be inserted through the center opening 284 in the annular disc 280 such that the fasteners 270 can secure the engine fan 126 to the fan base 198. The fan blades 282 can draw air through the opening 194 in the main section 200 of the fan cover 192 and drive the air through the two arms 204, 206 of the cover to each respective cylinder 128, 130.

The fan cover 192 may include side portions 286 extending around the main section 200 and both arms 204, 206. The side portions 286 extend generally perpendicular to the main section 200 and the arms 204, 206, with rounded corners connecting the side portions 286 to the main section 200 and the arms 204, 206. The side portions 286 may include a first plurality of tabs 288 that snap into receptacles 290 on a back plate 292 of the crankcase 220. The side portions 286 may also include a second plurality of tabs 294 each having an indented semicircle portion that receives a fastener 296. The fasteners 296 could include bolts that clamp the second plurality of tabs 294 to the back plate 292. The side portions 286 may also have a first and a second cutout 298, 299 that fit over the intake pipes 250, 252, and a third cutout 300 that fits over the starter motor 278.

FIG. 6 shows each cylinder 128, 130 comprising a plurality of cooling fins 302 extending around a periphery of a corresponding cylinder block 208, 210 and cylinder head 212, 214. Each cylinder 128, 130 may comprise one or more air guides 304, 306 mounted over the plurality of cooling fins 302. The cylinders 128, 130 may have inner surfaces 308 generally facing each other and outer surfaces 310 opposite the inner surfaces 308 with an inner air guide 306 mounted over each inner surface 308 and an outer air guide 304 mounted over each outer surface 310. The outer air guides 304 and the inner air guides 306 mount to the cylinders 128, 130 directing cooling air from the engine fan 126 through the plurality of cooling fins 302.

The outer and inner air guides 304, 306 may each have a front portion 312 extending to a front side of the respective cylinders 128, 130 (engine fan side) and a back portion 314 extending to the back side of the respective cylinders 128, 130. The outer and inner air guides 304, 306 direct cooling air from a front side of the cylinders 128, 130 through the cooling fins 302 to the back side of the cylinders 128, 130. Upon cooling the cylinders 128, 130, the cooling air can flow over the engine exhaust 132, which preferably extends from the engine 114 in a direction downstream from the engine fan 126. The engine exhaust 132 may include exhaust pipes 134, 136 extending from exhaust ports 316, 318 to a muffler 138 by extending through an opening 142 in the muffler box 140.

The muffler box 140 may cool the muffler 138 with air received through the opening 142 into the muffler box. The muffler box 140 may include a plurality of heat shield panels 320, 322, 324, 326, 328, 330. For instance, the muffler box 140 may include a top panel 320, a lower forward panel 322, an upper forward panel 324, a rearward panel 326, and two opposing side panels 328, 330 between the forward and rearward panels 322, 324, 326. The lower forward panel 322 extends short of the top panel 320 creating the opening 142 into the muffler box 140 through which the exhaust pipes 134, 136 can extend. The upper forward panel 324 extends from the lower forward panel 322 into a region between the exhaust pipes 134, 136, blocking heat transfer from an upper portion of the muffler 138 to the engine 114. The lower forward panel 322 and the upper forward panel 324 provide a heat shield 332 mounted between the muffler 138 and the engine 114.

The upper forward panel 324 can allow cooling air expelled from the engine 114 to pass into the muffler box 140 since the upper forward panel 324 is preferably positioned between flow paths from the cylinders 128, 130. The muffler box 140 also has deflector panels 334 surrounding the opening 142 directing air from the cylinders 128, 130 into the muffler box 140. As such, the engine exhaust 132 may comprise a muffler 138 positioned in a muffler box 140 that funnels cooling air expelled from the engine 114 over the muffler 138. The muffler box 140 may also have a rearward sloping top panel 336 connected to the rearward panel 326. The rearward sloping top panel 336 may be spaced apart from the top panel 320 creating an exhaust opening in the muffler box 140.

Figure 7:
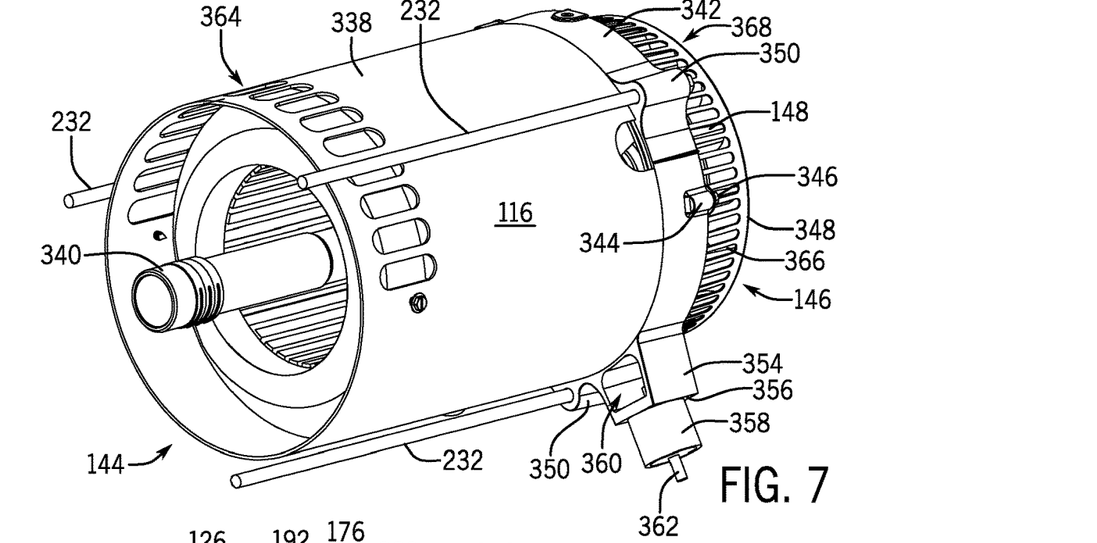
FIG. 7 is a perspective view from a left upper side of an alternator of the generator of FIG. 1, according to an embodiment of the invention.

Referring now to FIG. 7, a more detailed view of alternator 116 is shown, in accordance with an embodiment of the invention. The alternator 116 may include a cylindrical outer casing 338 with first end 144 having an alternator shaft 340 and second end 146 having alternator cooling fan 148. The cylindrical outer casing 338 may include a rotor bearing carrier 342 adjacent the alternator fan 148 at the second end 146. The rotor bearing carrier 342 may include a first set of flanges 344 with openings to receive fasteners 346 mounting a fan guard 348 over the alternator fan 148. The rotor bearing carrier 342 may include a second set of flanges 350 with openings to receive fasteners 232 mounting the alternator 116 to the alternator adaptor 172 (FIG. 4). The fasteners 232 may comprise bolts extending from the second set of flanges 350 beyond the first end 144 of the alternator 116 to couple the alternator adaptor.

The rotor bearing carrier 342 may include a lower support 354. The lower support 354 may include a bottom portion 356 that rests on a vibration isolator 358. The lower support 354 may also include a hollow portion 360 above the bottom portion 356 to access a fastener 362 extending through the bottom portion 356 and the vibration isolator 358.

In one embodiment of the invention, the alternator fan 148 can draw a stream of air into the alternator 116 through an inlet 364 located proximate the first end 144. The inlet 364 may be located in a side of the alternator 116 between the first end 144 and the second end 146 and may face perpendicular to the alternator shaft 340. The stream of air can be drawn by the alternator fan 148 axially through the alternator 116 to vents 366 in the fan guard 348. The vents 366 may comprise slots approximately parallel to the shaft 340 around a circumference of the fan guard 348. The fan guard 348 may include a solid plate 368 covering the second end 146 of the alternator 116 preventing air drawn into the alternator fan 148 through the second end 146. In another embodiment, the alternator fan 148 could drive air axially through the alternator 116 from vents in the second end 146 to a vent proximate the first end 144.

Figure 8:
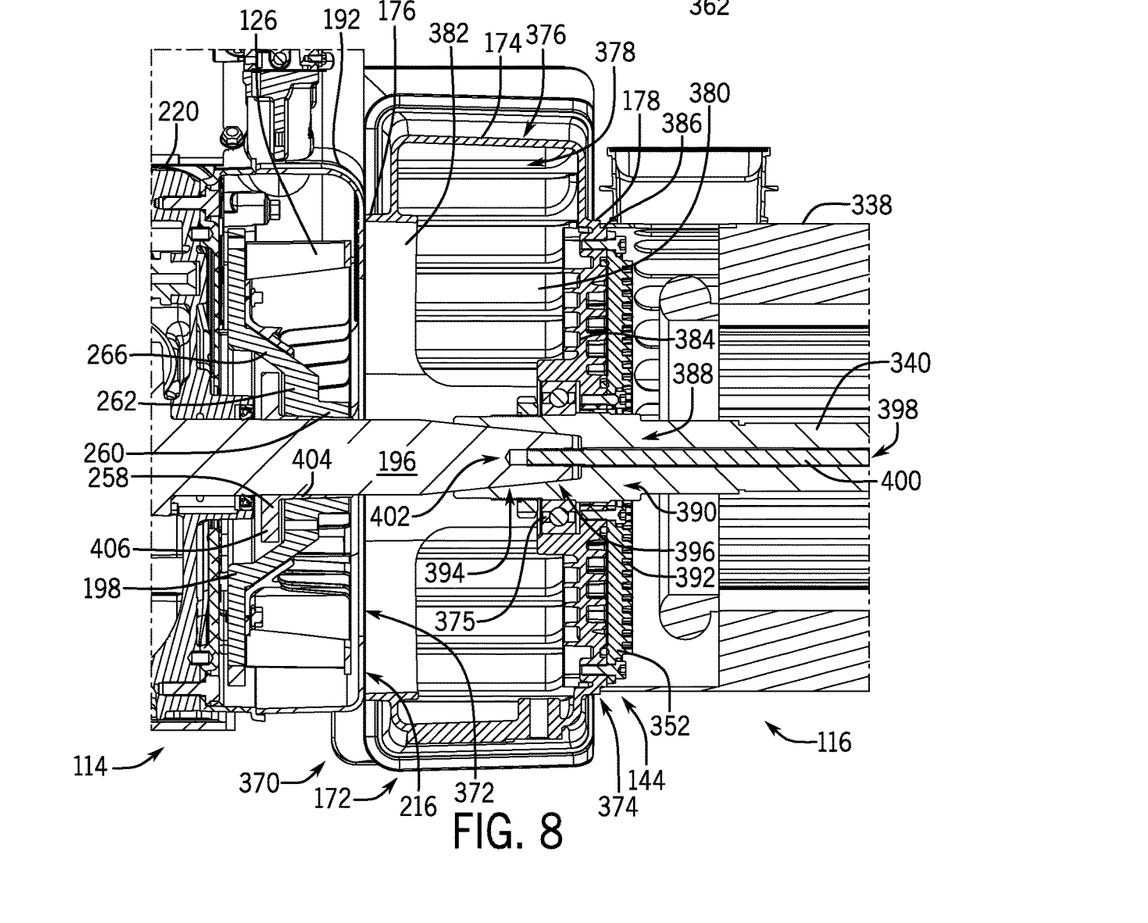
FIG. 8 is a partial cross-sectional view taken along line 8-8 of FIG. 3 showing an alternator adaptor coupled between the engine driving the alternator, according to an embodiment of the invention.

Referring now to FIG. 8, a cross sectional view of the alternator adaptor 172 coupling the alternator 116 to the engine 114 is shown, in accordance with an embodiment of the invention. As previously set forth, the alternator 116 may be driven by an air-cooled engine 114 via a shaft 196 extending from the engine to the alternator, and an engine cooling fan 126 may be operatively coupled to the shaft between the engine and the alternator. The alternator adaptor 172 may comprise a first end 370 coupled to the engine 114 with the first end comprising an airflow inlet 372 to the engine cooling fan 126 and may comprise a second end 374 coupled to the alternator 116. The alternator adaptor 172 may include a bearing 375 in the second end 374 to receive the alternator shaft 340 and support the input end of the alternator 116. The first end 370 of the adaptor may be spaced apart from the second end 374 allowing airflow into the alternator adaptor 172. Accordingly, the engine cooling fan 126 may be coupled to the shaft 196 in a spaced relationship from the alternator 116 so as to create an airflow path to the engine cooling fan 126 that bypasses the alternator 116. In another embodiment, the alternator adaptor 172 may provide a shroud 376 positioned around a portion of the crankshaft 196, the shroud 376 comprising an air inlet 378 shown as a plurality of vents 380 between the first end 370 and the second end 374, and comprising an air outlet 372 in the first end 370.

The alternator adaptor 172 may have the engine mounting flange 176 and the alternator mounting flange 178 mounted to opposing ends of the main body 174. The engine mounting flange 176 may comprise an outlet casement 382 extending from an interior of the main body 174 to mate against the alternator adaptor mounting surface 216 of the fan cover 192. The engine cooling fan 126 may draw air through the air outlet 372 in the engine mounting flange 176 to cool the engine 114. The alternator mounting flange 178 may comprise a circular plate 384 with an indented ridge 386 around a perimeter edge to receive the cylindrical outer casing 338 of the alternator 116. The circular plate 384 can mount against an end plate or adaptor plate 352 of the alternator 116 with both plates having an opening 388, 390 for passage of the alternator shaft 340. The openings 388, 390 may be small to prevent substantial airflow through the first end 144 of the alternator 116, thus preventing the alternator 116 and engine 114 from drawing air in opposite directions in the alternator adaptor 172. For improved structural integrity, ribs 392 may be formed on both sides of the circular plate 384.

FIG. 8 also shows the crankshaft 196 coupled to the crankcase 220. The crankshaft 196 may have a tapered end 394 that fits into a tapered opening 396 in the alternator shaft 340. The alternator shaft 340 may have a bore 398 extending axially through the shaft for a fastener 400. The crankshaft 196 may have a corresponding bore 402 to receive the fastener 400 holding the alternator shaft 340 to the crankshaft 196. The bores 398, 402 in both shafts 340, 196 may be threaded, either righthanded or lefthanded according to the rotation of the crankshaft 196 to self-tighten the fastener 400. Accordingly, the alternator 116 may be driven by the crankshaft 196 of the engine 114 on a side of the engine fan 126 opposite the crankcase 220.

As referred to previously, the engine 114 may include a bushing 258 coupled around the crankshaft 196. The bushing 258 may have an "L" shaped cross-section that encircles the crankshaft 196 forming a cylindrical component 404 and a flat component 406. The fan base 198 couples to the bushing 258 with the cylindrical component 260 of the fan base 198 surrounding the cylindrical component 404 of the bushing 258, and the flat component 262 of the fan base 198 fastened to the flat component 406 of the bushing 258. The domed shape component 266 of the fan base 198 extends over the flat component 406 of the bushing 258 allowing the engine fan 126 to be mounted proximate the crankcase 220.

Beneficially, embodiments of the invention provide a standby generator having an engine-generator set arranged within a standby generator enclosure for improved cooling. The standby generator may have an engine with an engine cooling fan operatively coupled to a crankshaft of the engine on a side of the engine driving an alternator. The engine cooling fan may drive cooling air over the engine in a direction opposite the alternator to prevent heating the alternator with expelled cooling air from the engine. The engine cooling fan is coupled to the crankshaft in a spaced relationship from the alternator so as to create an airflow path to the engine cooling fan that bypasses the alternator. The engine cooling fan may draw fresh cooling air through an air duct extending between the engine and the alternator to an opening in the standby generator enclosure and may drive the cooling air over the engine and into a muffler box, which preferably directs the cooling air over a muffler and out through another opening in the standby generator enclosure.

Therefore, according to one embodiment of the invention, a standby generator includes an air-cooled engine having a crankshaft, an alternator driven by the crankshaft to produce electrical power for distribution from the standby generator, and an engine cooling fan operatively coupled to the crankshaft on a side of the engine driving the alternator.

According to another embodiment of the invention, a generator includes an air-cooled engine, an alternator driven by the engine via a shaft extending from the engine to the alternator, and an engine cooling fan operatively coupled to the shaft between the engine and the alternator. The engine cooling fan may be coupled to the shaft in a spaced relationship from the alternator so as to create an airflow path to the engine cooling fan that bypasses the alternator.

According to yet another embodiment of the invention, a standby generator includes a generator housing having a base, a top, and a plurality of sidewalls defining an interior of the housing, the housing including one or more airflow inlets and one or more airflow outlets. The standby generator also includes an engine mounted to the base with the engine including a crankcase, a crankshaft coupled to the crankcase, and an engine fan driven by the crankshaft to cool the engine. The engine fan can draw a first stream of air into the housing through at least one of the one or more airflow inlets and drive the first stream of air out through at least one of the one or more airflow outlets. The standby generator further includes an alternator mounted to the base and driven by the crankshaft on a side of the engine fan opposite the crankcase.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A standby generator comprising:
   an air-cooled engine having a crankshaft,
   an alternator driven by the crankshaft to produce electrical power for distribution from the standby generator, and
   an engine cooling fan operatively coupled to the crankshaft on a side of the engine driving the alternator,
   wherein the alternator comprises an alternator cooling fan drawing air through the alternator in a direction opposite the engine.

2. The standby generator of claim 1 further comprising a shroud positioned around a portion of the crankshaft and comprising a first end mounted to the engine and a second end mounted to the alternator.

3. The standby generator of claim 2 wherein the shroud further comprises an air inlet between the first end and the second end and an air outlet in the first end; and
   wherein the engine is cooled with air drawn through the air outlet by the engine cooling fan.

4. The standby generator of claim 1 further comprising an air duct coupled to a side of the alternator in fluid communication with the alternator cooling fan.

5. The standby generator of claim 1 further comprising a multi-chamber standby generator enclosure comprising a plurality of chambers, wherein the engine and the alternator are mounted in separate respective chambers of the plurality of chambers.

6. The standby generator of claim 1 further comprising:
   an exhaust system operatively coupled to the engine, the exhaust system comprising:
      one or more exhaust pipes extending from the engine in a direction downstream from the engine cooling fan, and
      a muffler coupled to at least one of the one or more exhaust pipes; and
   a heat shield mounted between the muffler and the engine.

7. The standby generator of claim 1 wherein the engine comprises a v-twin engine having two cylinders and two cylinder heads, and
   further comprising a fan cover mounted over the engine cooling fan and over a side of each cylinder and each cylinder head facing the alternator.

8. A generator comprising:
   an air-cooled engine;
   an alternator driven by the engine via a shaft extending from the engine to the alternator; and
   an engine cooling fan operatively coupled to the shaft between the engine and the alternator; and
   wherein the engine cooling fan is coupled to the shaft in a spaced relationship from the alternator so as to create an airflow path to the engine cooling fan that bypasses the alternator.

9. The generator of claim 8 further comprising an alternator adaptor comprising:
   a first end coupled to the engine, the first end comprising an airflow inlet to the engine cooling fan; and
   a second end coupled to the alternator; and
   wherein the first end is spaced apart from the second end allowing airflow into the alternator adaptor.

10. The standby generator of claim 9 further comprising a fan cover mounted over the engine cooling fan between the engine and the alternator adaptor, the fan cover comprising an airflow opening surrounding the shaft.

11. The generator of claim 8 wherein the engine is a v-twin engine having two cylinders, and
    wherein each cylinder comprises one or more air guides mounted over a plurality of cooling fins extending from the respective cylinder.

12. The generator of claim 8 wherein the alternator comprises an alternator cooling fan on a side of the alternator opposite the engine.

13. The generator of claim 12 wherein the alternator cooling fan draws air into the alternator through an air inlet facing the shaft.

14. A standby generator comprising:
    a generator housing having a base, a top, and a plurality of sidewalls defining an interior of the housing, the housing comprising:
       one or more airflow inlets, and
       one or more airflow outlets;
    an engine mounted to the base, the engine comprising:
       a crankcase,
       a crankshaft coupled to the crankcase, and
       an engine fan driven by the crankshaft to cool the engine, the engine fan drawing a first stream of air into the housing through at least one of the one or more airflow inlets and driving the first stream of air out through at least one of the one or more airflow outlets; and
    an alternator mounted to the base, the alternator driven by the crankshaft on a side of the engine fan opposite the crankcase;
    wherein the alternator comprises an alternator fan driven by the crankshaft, the alternator fan cooling the alternator by drawing a second stream of air into the housing through at least one of the one or more airflow inlets and driving the second stream of air out through at least one of the one or more airflow outlets.

15. The standby generator of claim 14 wherein the first stream of air and the second stream of air are driven out of the housing through separate airflow outlets.

16. The standby generator of claim 15 wherein the separate airflow outlets are located at opposite ends of the housing.

17. The standby generator of claim 14 further comprising:
    an engine air duct coupling the engine to one or more airflow inlets in fluid communication with the engine fan; and
    an alternator air duct coupling the alternator to one or more airflow inlets in fluid communication with the alternator fan; and wherein the engine air duct and the alternator air duct are both coupled to one or more airflow inlets located in one of the top, the base, or the same sidewall.

18. The standby generator of claim 17 wherein the alternator is mounted to the engine in a spaced relationship with the engine air duct mounted therebetween.

19. The standby generator of claim 14 further comprising an engine exhaust extending from the engine in a direction downstream from the engine fan, the engine exhaust comprising a muffler positioned in a muffler box that funnels cooling air expelled from the engine over the muffler.

* * * * *